(12) United States Patent  
Smith et al.

(10) Patent No.: US 9,063,724 B2  
(45) Date of Patent: *Jun. 23, 2015

(54) INSTRUCTION EXECUTION

(75) Inventors: Peter Smith, Cambridgeshire (GB); David Richard Hargreaves, Cambridge (GB)

(73) Assignee: Cambridge Silicon Radio Limited, Cambridge (GB)

( * ) Notice: Subject to any disclaimer, the term of this patent is extended or adjusted under 35 U.S.C. 154(b) by 688 days.

This patent is subject to a terminal disclaimer.

(21) Appl. No.: 13/331,828

(22) Filed: Dec. 20, 2011

(65) Prior Publication Data

US 2012/0331276 A1 Dec. 27, 2012

(30) Foreign Application Priority Data

Dec. 24, 2010 (GB) .................................. 1021989.7

(51) Int. Cl.  
*G06F 9/30* (2006.01)

(52) U.S. Cl.  
CPC .......... *G06F 9/3016* (2013.01); *G06F 9/30185* (2013.01)

(58) Field of Classification Search  
CPC combination set(s) only.  
See application file for complete search history.

(56) References Cited

U.S. PATENT DOCUMENTS

| 5,241,679 | A | 8/1993 | Nakagawa et al. |
| 5,940,876 | A | 8/1999 | Pickett |
| 6,502,183 | B2 * | 12/2002 | Vlot et al. ...................... 712/202 |
| 6,502,187 | B1 * | 12/2002 | Miyagawa ..................... 712/225 |
| 6,560,692 | B1 * | 5/2003 | Kudo et al. ...................... 712/23 |
| 6,651,159 | B1 * | 11/2003 | Ramesh et al. ................ 712/209 |
| 6,651,160 | B1 | 11/2003 | Hays |
| 7,290,124 | B2 * | 10/2007 | Sugure et al. .................. 712/244 |
| 7,685,406 | B2 * | 3/2010 | Svec et al. ...................... 712/202 |
| 7,971,040 | B2 * | 6/2011 | Ayrignac et al. ............... 712/228 |
| 8,191,085 | B2 * | 5/2012 | Moyer .......................... 719/328 |
| 2002/0069350 | A1 | 6/2002 | Guey et al. |
| 2008/0133874 | A1 * | 6/2008 | Capek et al. .................. 711/206 |

FOREIGN PATENT DOCUMENTS

WO 2010/004245 A1 1/2010

* cited by examiner

*Primary Examiner* — Eric Coleman  
(74) *Attorney, Agent, or Firm* — Vorys, Sater, Seymour and Pease LLP; Vincent M DeLuca

(57) ABSTRACT

A method of executing an instruction set to select a set of registers, includes reading a first instruction of the instruction set; interpreting a first operand of the first instruction to represent a first register S to be selected; interpreting a second operand of the first instruction to represent a number N of registers to be selected; and selecting N consecutive registers starting at the first register S to form the set of registers.

14 Claims, 2 Drawing Sheets

INSTRUCTION EXECUTION

BACKGROUND OF THE INVENTION

This invention relates generally to instruction set computing. In particular, the invention relates to a method of executing an instruction set, and an execution processor for executing the instruction set.

Reduced instruction set computing (RISC) processors typically have a fixed bit-width instruction size. Common sizes are 16-bits and 32-bits. 32-bits give flexibility in expressing instructions and operands but at the expense of typically larger code size than the 16-bit instruction sets.

Some instruction sets incorporate an instruction to select multiple registers. For example a "push" instruction is an instruction which identifies one or more registers the contents of which are to be pushed onto a data stack. Similarly, a "pop" instruction is an instruction which identifies one or more registers the contents of which are to be popped off a data stack. Known instructions of these types identify the registers to be selected using a bit map. Each bit in an operand of the instruction corresponds to a respective register. Those registers for which the respective bit is a 1 in the bit map are pushed/popped. This type of bit-map instruction is efficient because it identifies multiple registers in one instruction and hence allows multiple registers to be pushed in one clock cycle. However, this type of instruction cannot readily be implemented in reduced instruction sets which use short instructions. This is because there are not enough bits in the short instructions to specify both the operator indicating that the instruction relates to pushing/popping registers and the operands indicating which registers are to be pushed/popped.

It is also known to specify registers by means of a lookup table. In this arrangement, the entries of the lookup table are common register combinations. An instruction can identify one of these common register combinations by specifying the appropriate entry in the lookup table. This enables multiple registers to be identified using only the number of bits required to identify the lookup table entry. This method is therefore suitable for use with reduced instruction sets which do not have a large supply of available bits. However, this method is limited in that only the common register combinations in the lookup table can be specified by the instruction. For uncommon register combinations the problem remains that the short instructions of a reduced instruction set are too short to specify both the operator indicating that the instruction relates to pushing/popping registers and the operands indicating which registers are to be pushed/popped.

There is therefore a need for a method of executing a reduced instruction set in which multiple registers can be more efficiently specified.

SUMMARY OF THE INVENTION

According to a first aspect, there is provided a method of executing an instruction set to select a set of registers, the method comprising: reading a first instruction of the instruction set; interpreting a first operand of the first instruction to represent a first register S to be selected; interpreting a second operand of the first instruction to represent a number N of registers to be selected; and selecting N consecutive registers starting at the first register S to form the set of registers.

Suitably, the method further comprises: interpreting a first operator of an instruction of the instruction set to indicate that data in the selected set of registers are to be pushed onto a data stack; and pushing the data in the selected set of registers onto the data stack.

Suitably, the method further comprises: interpreting a first operator of an instruction of the instruction set to indicate that data in the selected set of registers are to be popped off a data stack; and popping the data in the selected set of registers off the data stack.

Suitably, the method further comprises: reading a second instruction of the instruction set; and determining that the second instruction is not integral with the first instruction.

Suitably, the method further comprises: reading a third instruction and a fourth instruction of the instruction set; determining that the third instruction is integral with the fourth instruction; interpreting an operand of the fourth instruction to be a bitmap in which each bit corresponds to a register; and selecting those registers for which the corresponding bit has a predetermined value.

Suitably, the method further comprises: interpreting an operand of the third instruction to be a bitmap in which each bit corresponds to a register; and selecting those registers for which the corresponding bit has a predetermined value.

Suitably, the first operand of the first instruction comprises k bits and represents the first register S of a group of $2^k$ registers, and the method further comprises: if N is zero, interpreting the first operand of the first instruction to represent a further register L to be selected, wherein $L>2^k$.

Suitably, the first operand of the first instruction comprises k bits and represents the first register S of a group of $2^k$ registers, and the method further comprises: if N is zero, interpreting the first operand of the first instruction to represent a plurality of further registers to be selected, wherein the plurality of further registers is outside of the group of $2^k$ registers.

Suitably, the first operand of the first instruction comprises k bits and represents the first register S of a group of $2^k$ registers, and the method further comprises: if $S+N>2^k$, interpreting the combination of the first operand and second operand of the first instruction as representing a further register L to be selected, wherein $L>2^k$.

Suitably, the first operand of the first instruction comprises k bits and represents the first register S of a group of $2^k$ registers, and the method further comprises: if $S+N>2^k$, interpreting the combination of the first operand and second operand of the first instruction as representing a plurality of further registers to be selected, wherein the plurality of further registers is outside of the group of $2^k$ registers.

Suitably, the first operand of the first instruction comprises k bits and represents the first register S of a group of $2^k$ registers, and the method further comprises interpreting a third operand of the first instruction as representing a second register of the group of $2^k$ registers.

Suitably, the instruction set is a reduced instruction set.

Suitably, the instructions in the reduced instruction set are 16 bits long.

According to a second aspect, there is provided an execution processor arranged to execute an instruction set to select a set of registers, the execution processor comprising: an instruction reader arranged to read the instructions of the instruction set; an interpretation unit arranged to: interpret a first operand of a first instruction of the instruction set to represent a first register S to be selected; and interpret a second operand of the first instruction to represent a number N of registers to be selected; and a selection unit arranged to select N consecutive registers starting at the first register S to form the set of registers.

Suitably, the interpretation unit is further arranged to interpret a first operator of an instruction of the instruction set to indicate that data in the selected set of registers are to be pushed onto a data stack; and the selection unit is further arranged to push the data in the selected set of registers onto the data stack.

Suitably, the interpretation unit is further arranged to interpret a first operator of an instruction of the instruction set to indicate that data in the selected set of registers are to be popped off a data stack; and the selection unit is further arranged to pop the data in the selected set of registers off the data stack.

BRIEF DESCRIPTION OF THE DRAWINGS

The following disclosure will now be described by way of example with reference to the accompanying drawings. In the drawings.

DETAILED DESCRIPTION OF THE INVENTION

Instructions which are used to select multiple registers for the purpose of pushing the data in the selected registers onto a data stack, or alternatively popping the data in the selected registers off the data stack, typically select registers that are consecutive. The following described methods use this observation to decrease the number of bits generally required to identify the registers to be selected.

The following disclosure relates to reduced instruction sets. Reduced instruction sets typically have 16-bit long instructions, however it is to be understood that the disclosure extends to instructions having any number of bits.

Figure 1:
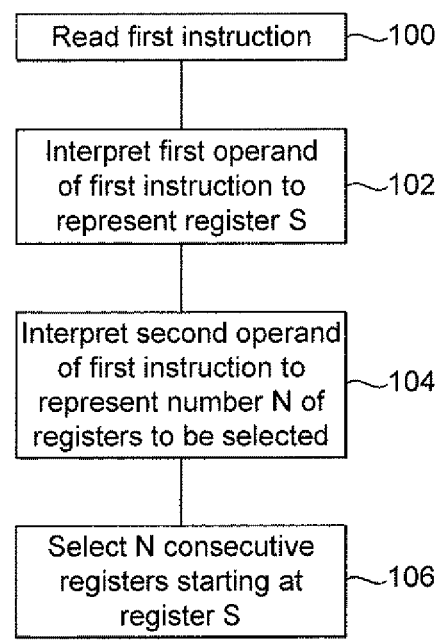
FIG. 1 is a flow diagram illustrating a method by which a processor executes an instruction to select a set of registers.
Figure 2:
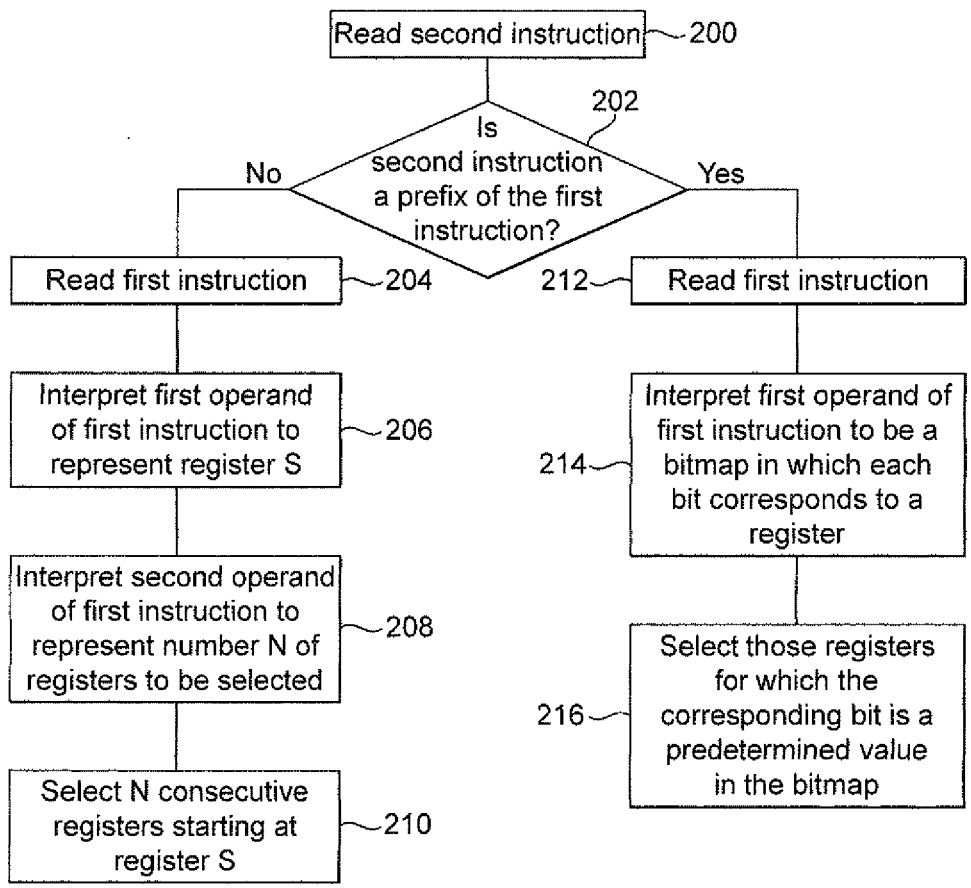
FIG. 2 is a flow diagram illustrating a further method by which a processor executes an instruction set to select a set of registers.

The flow diagrams of FIGS. 1 and 2 illustrate a sequence of steps. It is to be understood that not all the steps of these figures are necessarily required, and that some of the steps may be performed in a different order to that depicted. For example, the first instruction may be read by the execution processor prior to the execution processor reading the second instruction. Alternatively, the second instruction may be read by the execution processor prior to the execution processor reading the first instruction. As a further example, the execution processor may interpret the first operand of the first instruction prior to interpreting the second operand of the first instruction. Alternatively, the execution processor may interpret the second operand of the first instruction prior to interpreting the first operand of the first instruction.

FIG. 1 illustrates a method by which a processor executes an instruction for selecting registers. At step 100, the processor reads a first instruction in the instruction set. At step 102, the processor interprets a first operand of the first instruction to represent a register S. At step 104, the processor interprets a second operand of the first instruction to represent a number N of registers to be selected. At step 106, the processor selects N consecutive registers starting at register S to form a set of registers.

Suitably, the processor determines that the first instruction is a register selection instruction. Suitably, the processor determines that the first instruction is a register selection instruction by searching for an identifier in the first instruction. For example, the first instruction may include a sequence of bits which are identifiable by the processor as indicating that the first instruction is a register selection instruction. The identifier may be a sequence of bits that the processor identifies as a push operator. Alternatively, the identifier may be a sequence of bits that the processor identifies as a pop operator.

The set of selected registers may then be used for a 'push' operation or a 'pop' operation. In a push operation, the processor interprets an operator of an instruction of the instruction set as indicating that data in the selected set of registers are to be pushed onto a data stack. Preferably, the operator is in the first instruction. The processor then pushes the data in the selected set of registers onto the data stack. In a pop operation, the processor interprets an operator of an instruction of the instruction set as indicating that data in the selected set of registers are to be popped off a data stack. Preferably, the operator is in the first instruction. The processor then pops the data in the selected set of registers off the data stack.

The above-described method allows multiple consecutive registers to be selected using two short operands in a short instruction. This method enables multiple consecutive registers to be specified in the instruction using fewer bits than would be used for a corresponding specification in the bitmap approach discussed in the background section. Since, in practice, registers are often pushed consecutively, the above-described method enables a larger number of registers to be selected than if a bitmap was to be used in a short instruction. Since registers are often pushed consecutively, there is little loss in efficiency compared to the bitmap method. This method is also more flexible than the lookup table approach discussed in the background section because uncommon register combinations can also be specified in the instruction.

FIG. 2 illustrates a further method by which a processor executes an instruction set for selecting registers. In the method of FIG. 2, the execution processor performs the register selection in one of two modes. In the first mode, the registers are selected as described with reference to FIG. 1. In other words, an instruction is interpreted as specifying a start register S in one operand, and a number of registers N to be selected in another operand. N consecutive registers starting at register S are then selected. In the second mode, the registers are selected using the bitmap method described in the background section. This dual-mode method enables the method of FIG. 1 to be used when it is most efficient, i.e. when consecutive registers are being selected. Similarly, the dual-mode method enables the bitmap method to be used when it is most efficient, i.e. when multiple non-consecutive registers are being selected.

The execution processor determines which mode it is to interpret a register selection instruction in accordance with by searching for the presence of a prefix associated with the register selection instruction in the instruction set.

A prefix is an instruction which is associated with another instruction. A prefix is integral with another instruction. A prefix may be an instruction which forms a part of another instruction. A prefix may take one of many forms. For example, a prefix may include bits which are to be incorporated into the bits of another instruction. A prefix may include bits which are interpreted by an executing processor as altering the meaning of another instruction. A prefix contains the same number of bits as the instruction with which it is associated. For example, the reduced instruction set computer architecture MIPS uses short instructions each having 16 bits. Both an MIPS prefix and the MIPS instruction with which it is associated have 16 bits. Generally, a prefix extends the operand of the instruction with which it is associated.

Known reduced instruction sets use short instructions which can be grouped into three classes:
1) short instructions which are prefixes;
2) short instructions which are not prefixes but which are associated with one or more short instructions which are prefixes; and
3) short instructions which are isolated full instructions.

From hereon instructions which are not prefixes but which are associated with one or more instructions which are prefixes (group 2 above) will be called main instructions. For example, the register selection instruction described above is a main instruction.

FIG. 2 illustrates a method by which a processor executes an instruction set for selecting registers. In this example, the instruction set comprises a first instruction and a second instruction. The first instruction is a main instruction which is a register selection instruction. This main instruction may be a push instruction or a pop instruction. The second instruction is either (i) a prefix associated with the first instruction, or (ii) another instruction unrelated to the first instruction. If the second instruction is a prefix to the first instruction then the first instruction is interpreted as having one meaning. More specifically, if the second instruction is a prefix of the first instruction, then the processor interprets the first instruction as selecting registers using the bitmap method. If the second instruction is not a prefix to the first instruction then the first instruction is interpreted as having a different meaning. More specifically, if the second instruction is not a prefix of the first instruction, then the processor interprets the first instruction as selecting registers as described with reference to FIG. 1. In this latter situation, the second instruction is unrelated to the first instruction, and is processed by the execution processor accordingly.

Referring to FIG. 2, at step 200, the processor reads the second instruction in the instruction set. At step 202, the processor determines whether the second instruction is a prefix of a first instruction. If the answer to this determination is YES, that the second instruction is a prefix of a first instruction, then the method follows through to step 212 where the first instruction is read. Then, at step 214, the processor interprets a first operand of the first instruction to be a bitmap in which each bit corresponds to a register. At step 216, the processor selects those registers for which the corresponding bit has a predetermined value that indicates the corresponding register is to be selected. The predetermined value may be 1. Alternatively, the predetermined value may be 0. Those registers for which the corresponding bit does not have the predetermined value are not selected.

Since the reduced instruction set comprises instructions having 16 bits, it is preferable that the bitmap is held partially in an operand of the main instruction and partially in an operand of the prefix. For example, for a 16 bit bitmap, 4 bits are suitably held in the prefix and 12 bits in the main instruction. Therefore, suitably the processor interprets a first operand of the second instruction to also be a bitmap in which each bit corresponds to a register. The processor then selects those registers for which the corresponding bit (which may be in the first or second instruction) has a predetermined value that indicates the corresponding register is be selected.

If the answer to the determination of step 202 is NO, that the second instruction is not a prefix of a first instruction, then the method follows through to step 204 where the first instruction is read. At step 206 the processor interprets a first operand of the first instruction to represent a register S. At step 208, the processor interprets a second operand of the first instruction to represent a number N of registers to be selected. At step 210, the processor selects N consecutive registers starting at register S to form a set of registers.

Suitably, the processor determines if the second instruction is a prefix of the first instruction by searching for an identifier in the second instruction. For example, the prefix may include a sequence of bits which are identifiable by the processor as indicating that the instruction is a prefix. In an example instruction set comprising 16-bit long instructions, the identifier of a prefix constitutes the first 4 bits of the prefix. These first 4 bits are 1111. In a different example instruction set the identifier of a prefix could constitute a different number and/or different location of bits in the prefix.

The set of selected registers, whether obtained via the first mode of FIG. 2 or the second mode of FIG. 2, may then be used for a 'push' operation or a 'pop' operation as described with reference to FIG. 1. A push operation is executed if an operator, preferably in the main instruction, indicates that a push operation is to be undertaken. A pop operation is executed if an operator, preferably in the main instruction, indicates that a pop operation is to be undertaken.

In the method described with reference to FIG. 1 and the corresponding mode of steps 204 to 210 of FIG. 2, there are some S and N combinations that are not meaningful. Suitably, these S and N combinations are reassigned such that they have a different interpretation to the executing processor to that described above.

A first example of S and N combinations which may be interpreted differently to the interpretation described with respect to FIG. 1 is when N is zero. In the interpretation described with reference to FIG. 1, when N is zero no registers are selected for any value of S. If the operand representing the first register S comprises k bits, then that operand can specify any one in a group of $2^k$ registers. There are therefore $2^k$ degenerate encodings (N=0, S=0, 1, . . . $2^k-1$) which all result in an empty register list if interpreted as described with reference to FIG. 1. Suitably, these S and N combinations are remapped to have a different interpretation. Suitably, if N is zero, then the operand is interpreted to represent a further register L to be selected, where $L>2^k$. Alternatively, if N is zero, then the operand is interpreted to represent a plurality of further registers to be selected, the plurality of further registers being outside of the group of $2^k$ registers. Alternatively, if N is zero, then the operand may be interpreted as being re-used for a different instruction which is not related to selecting registers.

A second example of S and N combinations which may be interpreted differently to the interpretation described with respect to FIG. 1 is when both S and N are high numbers. For example, if the processor has 8 registers (R0 to R7), and S is 6, the only meaningful values of N are 1 and 2. This leads to registers R6 and R6,R7 being selected respectively. If S=6 and N=3, 4, 5, 6 or 7, no meaningful interpretation can be given (beyond selecting just R6,R7) because these values would select registers which do not exist, i.e R8, R9, R10 etc. Suitably, these S and N combinations are remapped to have a different interpretation. If the operand representing the first register S comprises k bits, then that operand can specify any one in a group of $2^k$ registers. Suitably, if $S+N>2^k$, then the instruction is interpreted to represent a further register L to be selected, where $L>2^k$. Alternatively, if $S+N>2^k$, then the instruction is interpreted to represent a plurality of further registers to be selected, the plurality of further registers being outside of the group of $2^k$ registers. Alternatively, $S+N>2^k$, then the operand may be interpreted as being re-used for a different instruction which is not related to selecting registers.

The described method utilises degenerate and meaningless S and N combinations by reassigning the meaning of instructions having these S and N combinations. Usefully, the S and N combinations can be interpreted to indicate a larger numbered register than can be expressed by the bits of the S operand. This therefore enables a larger range of registers to be identified by the register selection instruction.

Suitably, a register selection instruction operating in the mode described in FIG. 1 and steps 204 to 210 of FIG. 2 reserves a further operand which identifies whether a frame pointer register is to be selected. Suitably, another operand is reserved for identifying whether a register link (rLink) register is to be selected. If either the frame pointer or rLink registers are included in the group of $2^k$ registers specified by the S operand, then there are two ways of specifying the register in the instruction (the reserved operand and the S operand). In this case, suitably the way of specifying the register using the S operand is reassigned to another interpretation. For example, the operand is instead interpreted to represent a further register L to be selected, where $L>2^k$. Alternatively, the operand is instead interpreted to represent a plurality of further registers to be selected, the plurality of further registers being outside of the group of $2^k$ registers. Alternatively, the operand may instead be interpreted as being re-used for a different instruction which is not related to selecting registers.

This disclosure also relates to an execution processor which is arranged to execute an instruction set which is formed according to the protocol described herein. The execution processor is arranged to perform any or all of the methods of FIGS. 1 and 2.

Preferably, the execution processor is implemented in software. Optionally, the execution processor is implemented in hardware.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A method of executing an instruction set to select a set of registers, the method comprising:
    reading a first instruction of the instruction set;
    interpreting a first operand of the first instruction to represent a first register S of said set of registers to be selected, where S is an integer;
    interpreting a second operand of the first instruction to represent a number N of registers to be selected;
    selecting N consecutive registers starting at the first register S to form the set of registers;
    reading a second instruction of the instruction set;
    determining that the second instruction is not integral with the first instruction;
    reading a third instruction and a fourth instruction of the instruction set;
    determining that the third instruction is integral with the fourth instruction;
    interpreting an operand of the fourth instruction to be a bitmap in which each bit corresponds to a register; and
    selecting those registers for which the corresponding bit has a predetermined value.

2. A method as claimed in claim 1, further comprising:
    interpreting a first operator of an instruction of the instruction set to indicate that data in the selected set of registers are to be pushed onto a data stack; and
    pushing the data in the selected set of registers onto the data stack.

3. A method as claimed in claim 1, further comprising:
    interpreting a first operator of an instruction of the instruction set to indicate that data in the selected set of registers are to be popped off a data stack; and
    popping the data in the selected set of registers off the data stack.

4. A method as claimed in claim 1, further comprising:
    interpreting an operand of the third instruction to be a bitmap in which each bit corresponds to a register; and
    selecting those registers for which the corresponding bit has a predetermined value.

5. A method as claimed in claim 1, wherein the first operand of the first instruction comprises k bits and represents the first register S of a group of $2^k$ registers, the method further comprising:
    if N is zero, interpreting the first operand of the first instruction to represent a further register L to be selected, wherein L is an integer such that $L>2^k$.

6. A method as claimed in claim 1, wherein the first operand of the first instruction comprises k bits and represents the first register S of a group of $2^k$ registers, the method further comprising:
    if N is zero, interpreting the first operand of the first instruction to represent a plurality of further registers to be selected, wherein the plurality of further registers is outside of the group of $2^k$ registers.

7. A method as claimed in claim 1, wherein the first operand of the first instruction comprises k bits and represents the first register S of a group of $2^k$ registers, the method further comprising:
    if $S+N>2^k$, interpreting the combination of the first operand and second operand of the first instruction as representing a further register L to be selected, wherein L is an integer such that $L>2^k$.

8. A method as claimed in claim 1, wherein the first operand of the first instruction comprises k bits and represents the first register S of a group of $2^k$ registers, the method further comprising:
    if $S+N>2^k$, interpreting the combination of the first operand and second operand of the first instruction as representing a plurality of further registers to be selected, wherein the plurality of further registers is outside of the group of $2^k$ registers.

9. A method as claimed in claim 1, wherein the first operand of the first instruction comprises k bits and represents the first register S of a group of $2^k$ registers, the method further comprising interpreting a third operand of the first instruction as representing a second register of the group of $2^k$ registers.

10. A method as claimed in claim 1, wherein the instruction set is a reduced instruction set.

11. A method as claimed in claim 10, wherein instructions in the reduced instruction set are 16 bits long.

12. An execution processor arranged to execute an instruction set to select a set of registers, the execution processor including electronic circuitry and comprising:
    an instruction reader arranged to read the instructions of the instruction set;
    an interpretation unit arranged to:
        interpret a first operand of a first instruction of the instruction set to represent a first register S of said set of registers to be selected, where S is an integer;
        interpret a second operand of the first instruction to represent a number N of registers to be selected;
        determine that a second instruction of the instruction set is not integral with the first instruction;
        determine that a third instruction of the instruction set is integral with a fourth instruction of the instruction set and interpret an operand of the fourth instruction to be a bitmap in which each bit corresponds to a register; and a selection unit arranged to select N consecutive registers starting at the first register S to form the set of registers, and to select those registers for which the corresponding bit has a predetermined value.

13. An execution processor as claimed in claim 12, wherein the interpretation unit is further arranged to interpret a first operator of an instruction of the instruction set to indicate that data in the selected set of registers are to be pushed onto a data stack; and the selection unit is further arranged to push the data in the selected set of registers onto the data stack.

14. An execution processor as claimed in claim 12, wherein the interpretation unit is further arranged to interpret a first operator of an instruction of the instruction set to indicate that data in the selected set of registers are to be popped off a data stack; and the selection unit is further arranged to pop the data in the selected set of registers off the data stack.

* * * * *